US009516301B2

(12) United States Patent
De Collibus et al.

(10) Patent No.: US 9,516,301 B2
(45) Date of Patent: *Dec. 6, 2016

(54) MULTIDIRECTIONAL DISPLAY SYSTEM

(71) Applicant: International Business Machines Corporation, Armonk, NY (US)

(72) Inventors: Francesco M. De Collibus, Segrate (IT); Luca Landi, Rome (IT); Claudio Prudenzi, Milan (IT)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/948,859

(22) Filed: Nov. 23, 2015

(65) Prior Publication Data

US 2016/0119616 A1 Apr. 28, 2016

Related U.S. Application Data

(63) Continuation of application No. 13/655,752, filed on Oct. 19, 2012, now Pat. No. 9,213,226.

(30) Foreign Application Priority Data

Oct. 19, 2011 (EP) .................................... 11185726

(51) Int. Cl.

| | |
|---|---|
| ***G03B 21/56*** | (2006.01) |
| ***G02B 27/22*** | (2006.01) |
| ***H04N 13/04*** | (2006.01) |
| ***G03B 21/28*** | (2006.01) |
| ***G09G 3/00*** | (2006.01) |
| *G03B 31/00* | (2006.01) |

(52) U.S. Cl.

CPC ...... *H04N 13/0497* (2013.01); *G02B 27/2285* (2013.01); *G03B 21/28* (2013.01); *G03B 21/562* (2013.01); *G09G 3/003* (2013.01); *H04N 13/0459* (2013.01); *G03B 31/00* (2013.01); *G09G 2340/0435* (2013.01)

(58) Field of Classification Search

CPC ................ G03B 21/562; G03B 21/56; H04N 13/0493; H04N 13/0497; G02B 27/2285

USPC ........... 353/46, 10; 359/446, 477, 478, 479; 348/44

See application file for complete search history.

(56) References Cited

U.S. PATENT DOCUMENTS

| | | | | |
|---|---|---|---|---|
| 2,967,905 | A * | 1/1961 | Hirsch | 342/180 |
| 7,967,451 | B2 | 6/2011 | Chen et al. | |
| 2002/0008676 | A1 | 1/2002 | Miyazaki et al. | |
| 2002/0067467 | A1 * | 6/2002 | Dorval | G02B 27/2285 353/10 |
| 2005/0041218 | A1 | 2/2005 | Hoshino et al. | |
| 2013/0100358 | A1 | 4/2013 | De Collibus et al. | |

FOREIGN PATENT DOCUMENTS

| | | |
|---|---|---|
| JP | 2003344962 A | 12/2003 |

OTHER PUBLICATIONS

U.S. Appl. No. 13/655,752, Non-Final Office Action, Sep. 12, 2014, 7 pg.
U.S. Appl. No. 13/655,752, Final Office Action, Apr. 10, 2015, 9 pg.
U.S. Appl. No. 13/655,752, Notice of Allowance, Aug. 5, 2015, 9 pg.

* cited by examiner

*Primary Examiner* — William C Dowling
*Assistant Examiner* — Ryan Howard
(74) *Attorney, Agent, or Firm* — Cuenot, Forsythe & Kim, LLC

(57) ABSTRACT

An optical display system includes a projection system for outputting images having an image refresh frequency and a two-dimensional screen for receiving the images. The screen is coupled to a motion unit which allows a motion of the screen at a frequency which is equal to the refresh frequency of the images.

12 Claims, 3 Drawing Sheets

100 II II A50 20 50 30 60 10 18 18 14 20 A10 12

MULTIDIRECTIONAL DISPLAY SYSTEM

CROSS-REFERENCE TO RELATED APPLICATIONS

This application claims the benefit of European Application Number 11185726.4 filed on Oct. 19, 2011, which is fully incorporated herein by reference.

BACKGROUND

It is known in the art to generate three dimensional images of objects which can be observed from all spatial orientations. However, a different view of the object is to be seen from different spatial orientations.

BRIEF SUMMARY

An optical display system includes a projection system for outputting images having an image refresh frequency and a two-dimensional screen for receiving the images. The screen is coupled to a motion unit which allows a motion of the screen at a frequency which is equal to the refresh frequency of the images.

An method includes outputting images from a projection system, wherein the images have an image refresh frequency, and receiving the images using a two-dimensional screen. The screen is coupled to a motion unit which allows a motion of the screen at a frequency which is equal to the refresh frequency of the images.

BRIEF DESCRIPTION OF THE SEVERAL VIEWS OF THE DRAWINGS

The present invention together with the above-mentioned and other objects and advantages may best be understood from the following detailed description of the embodiments, but not restricted to the embodiments, wherein is shown in.

Figure 1:
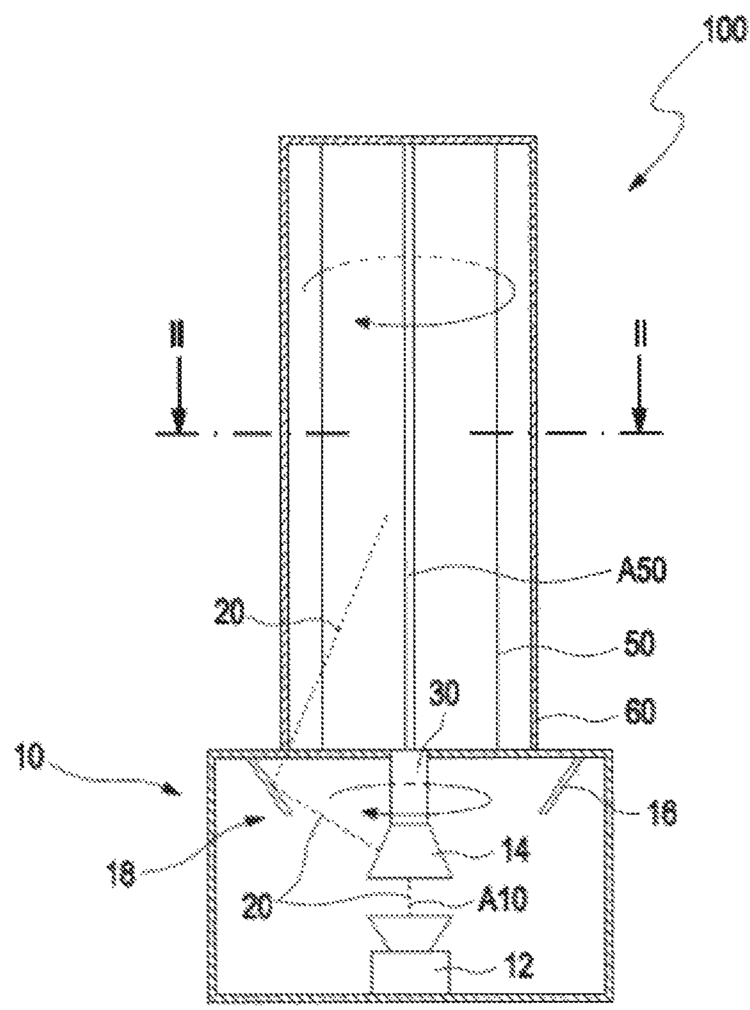
FIG. 1 is a longitudinal cut view of an example embodiment of an optical display system according to an embodiment of the invention.

In the drawings, like elements are referred to with equal reference numerals. The drawings are merely schematic representations, not intended to portray specific parameters of the invention. Moreover, the drawings are intended to depict only typical embodiments of the invention and therefore should not be considered as limiting the scope of the invention.

DETAILED DESCRIPTION

One or more embodiments of the invention relate to a display system and, more particularly, to a multidirectional display system.

It is an object of the invention to provide a display system which is easy to use and employ and which requires simpler constituents.

This object is achieved by the features of the independent claim. The other claims, the drawings and the specification disclose advantageous embodiments of the invention.

An optical display system is proposed, comprising a projection system for outputting images having an image refresh frequency; and a two-dimensional screen for receiving the images, wherein the screen is coupled to a motion unit which allows a motion of the screen at a frequency which is equal to the refresh frequency of the images.

Advantageously, a two-dimensional screen can be employed for generating a multidirectional view, particularly of a video where video frames are updated with a refresh frequency or a dynamic image being updated with a refresh frequency.

The screen displays a two dimensional view, e.g., an image or a video frame. Advantageously, it is possible for a multitude of persons in different angular orientations with respect of the screen to observe the same scenario on the screen. Particularly, people facing each other with the screen arranged between them may nevertheless observe an identical view on the screen with each one's individual field of view.

A typical refresh frequency of a video frame of an image on a pc monitor is 30 Hz, or 60 Hz. When the screen rotates with the refresh frequency, the image or frame will stay on the screen exactly the time of rotation, hence a person can see all images or frames. The velocity of the motion of the screen makes the flow of image or frame movements fluid for an observer.

According to a favorable embodiment, the motion unit may provide a rotational motion of the screen about an axis of rotation. Favorably, the moving screen can be created that can be located in e.g. the center of a table and persons distributed 360° around the table can look at the screen and see it as it is in front of them. When the screen rotates with the refresh frequency, the image or frame will stay on the screen exactly the time of rotation, hence a person can see all images or frames.

According to a favorable embodiment, the motion unit may provide a tilting motion of the screen about an axis tilting. When the screen is tilted with the refresh frequency, the image or frame will stay on the screen exactly the time of rotation, hence a person can see all images or frames in the angular range according to the reversal points of the tilt movement. For instance, a synchronous display of the image can be achieved at selected distinct angular positions with respect of the screen.

According to a favorable embodiment, the projection system may comprise an optical direction unit which directs optical beams corresponding to the images from an image source to the screen synchronous with the refresh frequency.

According to a favorable embodiment, a spatial orientation of the optical beams may be stationary in respect of the screen. Particularly, the optical direction unit comprises a deflecting device for deflecting the optical beams away from the optical axis synchronous with the refresh frequency. Preferably, the optical direction unit comprises a reflecting device for directing the deflected optical beams towards the screen synchronous with the refresh frequency.

According to a favorable embodiment, the deflecting device and the reflecting device may move synchronously in respect of one another. The devices can be arranged in a single optical constructional subassembly which facilitates the mounting of the system.

According to a favorable embodiment, the reflecting device may comprise a rotating mirror. The mirror may particularly have a plane reflecting surface.

According to a favorable embodiment, moving parts of the optical direction unit may be stationary in respect of the screen.

According to a favorable embodiment, the axis may be collinear with an optical axis of the projection system. The arrangement is easy to align as desired.

According to a favorable embodiment, the screen may be enclosed in a housing which is at least partially optically transparent. For instance, the housing may be a transparent cylinder that encloses the rotating panel. The actual image on the rotating screen can be observed through the housing. Because the frequency of rotation or tilting of the screen equals the refresh frequency of the dynamic image or video outputted from the projection system and the optical direction device, respectively, a frame or image will stay on the screen the exact time of rotation or tilting, so that all images or frames can be seen when observed from a particular location in the circumference of the housing and the screen.

According to a favorable embodiment, the images may be video frames. It is possible to see video without any image processing from 360°. The optical direction system can project directly a normal video stream towards the moving screen.

According to a favorable embodiment, an audio device may be coupled to the system, e.g., to the screen or the projecting system or the like. Adding audio functionality to the system is technically simple and this allows to output or input audio information. Expediently, the system can be used in the field of unified collaboration and communication as video and audio device. It can substitute traditional video systems in order to have a system that can be put on a table so all attendees of a meeting can sit around the table and attend the meeting in front of each other. An individual attendee can see the other attendees and observe at the same time the screen displaying a video conference.

According to a favorable embodiment, the system may be implemented in a television set. It is possible to watch TV omnidirectionally without any image processing.

Figure 2:
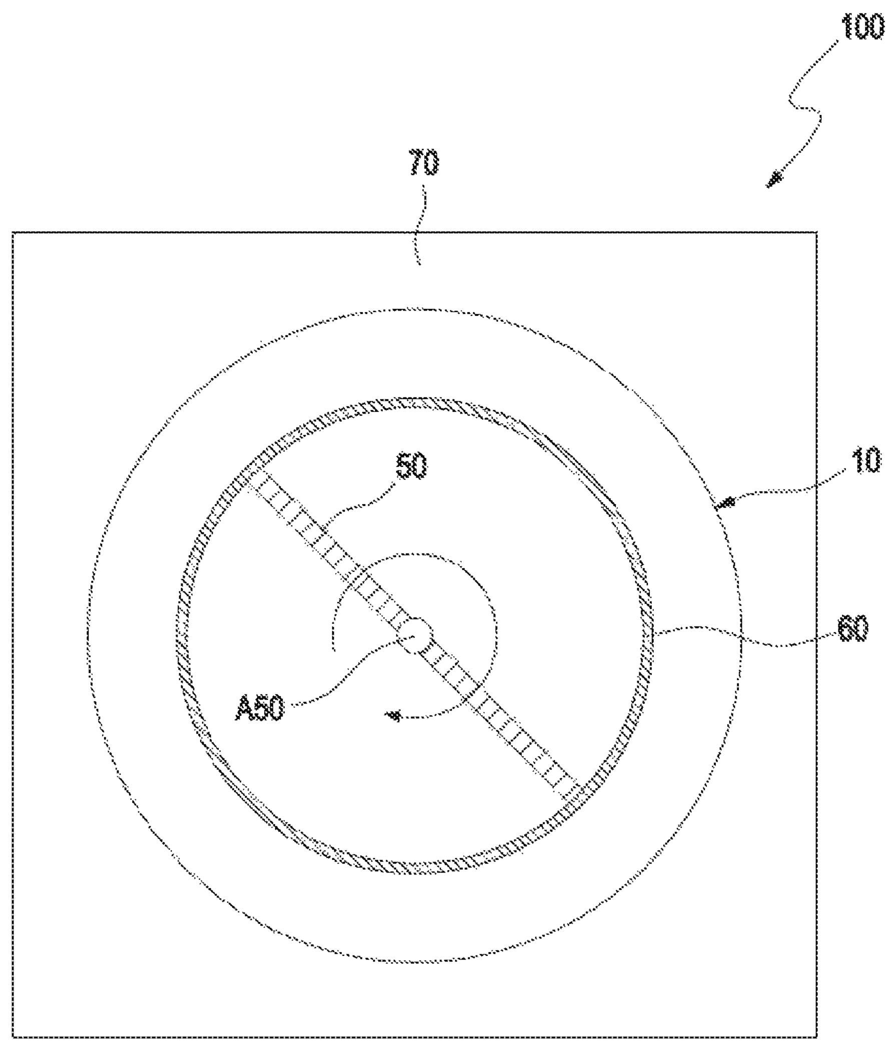
FIG. 2 is a cross cut view through the system of FIG. 1 along line II-II.
Figure 3:
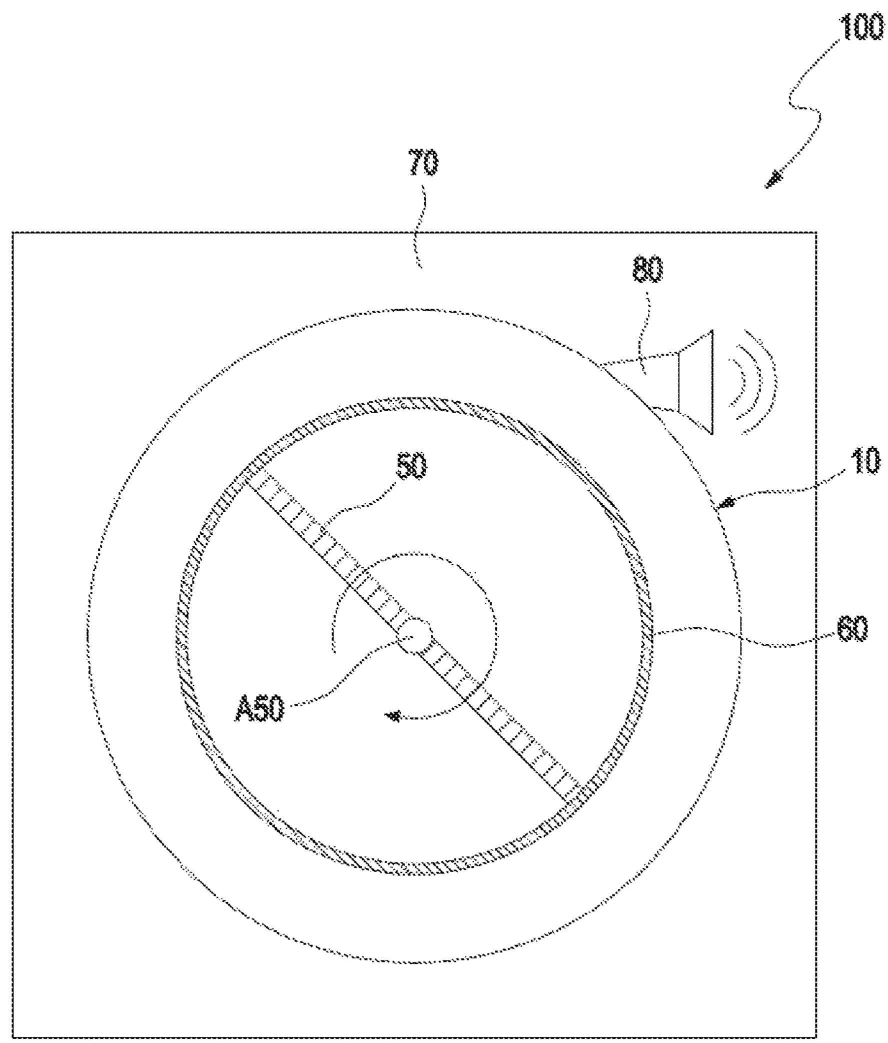
FIG. 3 is an alternative arrangement of the example embodiment shown in FIG. 2.

FIG. 1 depicts schematically in a longitudinal cut view an example embodiment of an optical display system 100 according to the invention whiles FIGS. 2 and 3 show a cross sectional view according to line II-II in FIG. 1.

The optical display system 100 comprises a projection system 10 for outputting images having an image refresh frequency and a two-dimensional screen 50 for receiving the images. The screen 50 is coupled to a motion unit 30 which allows a motion of the screen 50 at a frequency which is equal to the refresh frequency of the images. By way of example, the images may be images displayed on a pc monitor, a television set or video frames.

The motion unit 30 provides a rotational motion of the screen 50 about an axis A50 of rotation. Alternatively, the motion unit 30 may provide a swiveling or tilting motion of the screen 50 about the axis A50.

The projection system 10 comprises an optical direction unit 18 which directs optical beams 20 corresponding to the images from an image source 12 to the screen 50 synchronous with the refresh frequency. The image source 12 may be a video projector, for instance.

An optical beam 20 is directed from the optical exit of the image source 12 towards the screen 50. A spatial orientation of the optical beam 20 is stationary in respect of the screen 50.

The optical direction unit 18 comprises a deflecting device 14 for deflecting the optical beams 20 away from an optical axis A10 and a reflecting device 16 for directing the deflected optical beams 20 towards the screen 50 synchronous with the refresh frequency. Deflecting device 14 is preferably a lens which deflects the optical beam 20 by refraction. The reflecting device 16 is preferably a mirror.

In one embodiment, the deflecting device 14 and the reflecting device 16 are rotating about an optical axis A10 of the optical direction unit 18 and the projecting system 10. The optical axis A10 is collinear with the rotation/tilt axis A50 of the screen.

Deflecting device 14 and reflecting device 16 move synchronously in respect of one another and with the same frequency as the screen.

In another embodiment, the reflection device 16 may be a stationary reflector ring instead of a rotating reflection device 16.

All moving parts of the optical direction unit 18, i.e., the deflecting device 14 and/or the reflection device 16 are stationary in respect of the screen 50 as they move with the same frequency, synchronously with the refresh frequency of the images. Particularly, the moving parts and the screen 50 can be driven by the same motion unit 30. Of course, separate drive units can be provided for the components.

The screen 50 is enclosed in a housing 60 which is at least partially optically transparent. By way of example, the housing is a transparent cylinder which protects the rotating screen 50.

An audio device 80 may be coupled to the system 100 (FIG. 3).

The optical display system 100 can be placed on a table 70 so that persons can observe the screen around the perimeter of the housing 60.

When the optical direction unit 18 (its optical refracting and reflecting devices 14, 16) rotates in unison with each other and the screen 50 the two dimensional screen 50 can be used to generate a omnidirectional image, for instance for displaying a video. From any perspective, the screen 50 appears as a traditional video which even does not change when an observer moves around the perimeter of the housing 60 so that all observers see the same image on the screen 50. In contradistinction to a traditional display, however, where every observer must sit on one side of a static display, the observers can be at any position around the central screen 50.

The two dimensional screen 50 and the moving/rotating parts of the optical direction unit 18 rotate at a rate that matches the video frame rate so that there is a new image each period of rotation in order to avoid any one observer seeing skipped or repeated frames. Typical rates, i.e. refresh frequencies, used in video projectors are 30 Hz or 60 Hz, for instance. The size of the screen 50 can be adapted to the tolerable inertia caused by the rotation or tilting movement, depending on the materials and construction used for the system.

What is claimed is:

1. An optical display system, comprising:

a projection system configured to output images, and a two-dimensional screen configured to receive the images, wherein the screen is configured to rotate at a frequency equal to a refresh frequency at which the projection system outputs the images, and the projection system includes an optical direction unit configured to direct optical beams corresponding to the images to the screen synchronous with the refresh frequency, wherein moving portions of the optical direction unit are stationary relative to the screen.

2. The system of claim 1, wherein the optical direction unit includes a deflecting device configured to deflect the optical beams away from an optical axis synchronous with the refresh frequency.

3. The system of claim 2, wherein the optical direction unit includes a reflecting device configured to direct the deflected optical beam towards the screen synchronous with the refresh frequency.

4. The system of claim 3, wherein the reflecting device includes a rotating mirror.

5. The system of claim 1, wherein a spatial orientation of the optical beams is stationary relative to the screen.

6. The system of claim 1, wherein an axis of rotation of the screen is collinear with an optical axis of the projection system.

7. A method, comprising:

outputting images at a refreshing frequency using a projection system;

rotating a two-dimensional screen, configured to receive the images, at a frequency equal to a refresh frequency at which the projection system outputs the images; and directing, using an optical direction unit, optical beams corresponding to the images to the screen synchronous with the refresh frequency, wherein moving portions of the optical direction unit are stationary relative to the screen.

8. The method of claim 7, wherein deflecting the optical beams away from an optical axis synchronous with the refresh frequency.

9. The method of claim 8, wherein directing, using a reflecting device, the deflected optical beam towards the screen synchronous with the refresh frequency.

10. The method of claim 9, wherein the reflecting device includes a rotating mirror.

11. The method of claim 7, wherein a spatial orientation of the optical beams is stationary relative to the screen.

12. The method of claim 7, wherein an axis of rotation of the screen is collinear with an optical axis of the projection system.

* * * * *